US012568403B2

(12) United States Patent
Lei

(10) Patent No.: US 12,568,403 B2
(45) Date of Patent: Mar. 3, 2026

(54) SUPPORTING SWITCHING BETWEEN BASE STATIONS THAT PROVIDE MULTICAST AND BROADCAST SERVICE

(71) Applicant: Tencent Technology (Shenzhen) Company Limited, Guangdong (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 313 days.

(21) Appl. No.: 17/978,060

(22) Filed: Oct. 31, 2022

(65) Prior Publication Data

US 2023/0050709 A1      Feb. 16, 2023

Related U.S. Application Data

(63) Continuation of application No. PCT/CN2021/116622, filed on Sep. 6, 2021.

(30) Foreign Application Priority Data

Sep. 30, 2020    (CN) .......................... 202011061451.8

(51) Int. Cl.
*H04W 36/00*          (2009.01)
*H04W 36/08*          (2009.01)
(52) U.S. Cl.
CPC ... *H04W 36/0007* (2018.08); *H04W 36/0055* (2013.01); *H04W 36/0058* (2018.08); *H04W 36/08* (2013.01)
(58) Field of Classification Search
CPC ......... H04W 36/0007; H04W 36/0055; H04W 36/0058; H04W 36/08
See application file for complete search history.

(56) References Cited

U.S. PATENT DOCUMENTS

| | | | | |
|---|---|---|---|---|
| 10,477,443 | B2 * | 11/2019 | Ranta-Aho | ....... H04W 36/0007 |
| 2010/0061289 | A1 * | 3/2010 | Mun | ....................... H04W 4/12 |
| | | | | 370/312 |

(Continued)

FOREIGN PATENT DOCUMENTS

| | | |
|---|---|---|
| CN | 101267593 A | 9/2008 |
| CN | 101400028 A | 4/2009 |

(Continued)

OTHER PUBLICATIONS

Chinese Office Action issued in Application No. 202011061451.8, mailed Jan. 12, 2023, with Concise English Translation, 14 pages.

(Continued)

*Primary Examiner* — Kenny S Lin
(74) *Attorney, Agent, or Firm* — ArentFox Schiff LLP

(57)          ABSTRACT

A multicast and broadcast service (MBS) switching method includes acquiring, by a base station serving a user equipment, capability information of other base stations for an MBS, the capability information indicating whether the MBS is supported by each of the other base stations. The method further includes determining, according to the capability information of the other base stations for the MBS, whether a first base station of the other base stations supports the MBS in response to a determination to switch the MBS of the user equipment to the first base station. The method further includes initiating an MBS switching request to the first base station in response to a determination that the first base station supports the MBS, the MBS switching request indicating to switch the MBS of the user equipment from the base station serving the user equipment to the first base station.

20 Claims, 9 Drawing Sheets

(56) References Cited

U.S. PATENT DOCUMENTS

| | | | | |
|---|---|---|---|---|
| 2011/0228717 | A1* | 9/2011 | Kim | H04W 76/40 |
| | | | | 370/312 |
| 2012/0236776 | A1* | 9/2012 | Zhang | H04W 60/00 |
| | | | | 370/312 |
| 2013/0044668 | A1 | 2/2013 | Purnadi et al. | |
| 2014/0073303 | A1* | 3/2014 | Henderson | H04W 16/00 |
| | | | | 455/418 |
| 2014/0140260 | A1* | 5/2014 | Wang | H04W 36/0016 |
| | | | | 370/312 |
| 2014/0313969 | A1* | 10/2014 | Kalhan | H04W 72/30 |
| | | | | 370/312 |
| 2018/0070247 | A1* | 3/2018 | Gormley | H04W 88/08 |
| 2018/0077615 | A1* | 3/2018 | El-Najjar | H04W 36/0027 |
| 2018/0184415 | A1* | 6/2018 | Rong | H04W 40/20 |
| 2022/0110155 | A1* | 4/2022 | Chou | H04W 74/085 |
| 2023/0276203 | A1* | 8/2023 | Sebire | H04W 4/06 |
| | | | | 370/312 |

FOREIGN PATENT DOCUMENTS

| | | | |
|---|---|---|---|
| CN | 102685682 | A | 9/2012 |
| CN | 107659900 | A | 2/2018 |
| CN | 108055681 | A | 5/2018 |
| CN | 112243199 | A | 1/2021 |
| EP | 2200367 | A1 | 6/2010 |
| EP | 2797361 | A2 | 10/2014 |
| JP | 2008244910 | A | 10/2008 |
| JP | WO2008114449 | A | 7/2010 |
| JP | 2013534087 | A | 8/2013 |
| JP | 2014003386 | A | 1/2014 |
| JP | 2014515227 | A | 6/2014 |
| JP | 2017526300 | A | 9/2017 |
| WO | 2019114939 | A | 6/2019 |

OTHER PUBLICATIONS

Supplementary European Search Report issued in Application No. 21874190.8, mailed Oct. 26, 2023, 8 pages.

Japanese Office Action issued in Application No. 2022-563194, mailed Jun. 26, 2023, with English Translation, 22 pages.

International Search Report and Written Opinion issued in International Application No. PCT/CN2021/116622, mailed Nov. 12, 2021, with English Translation, 9 pages.

Huawei et al. "KI#7, New Solution: Inter-RAN Node MBS Session Handover" 3GPP TSG SA2 Meeting #139E, 62-2003966, May 22, 2020, pp. 1-8.

* cited by examiner

Unicast source

Multicast source

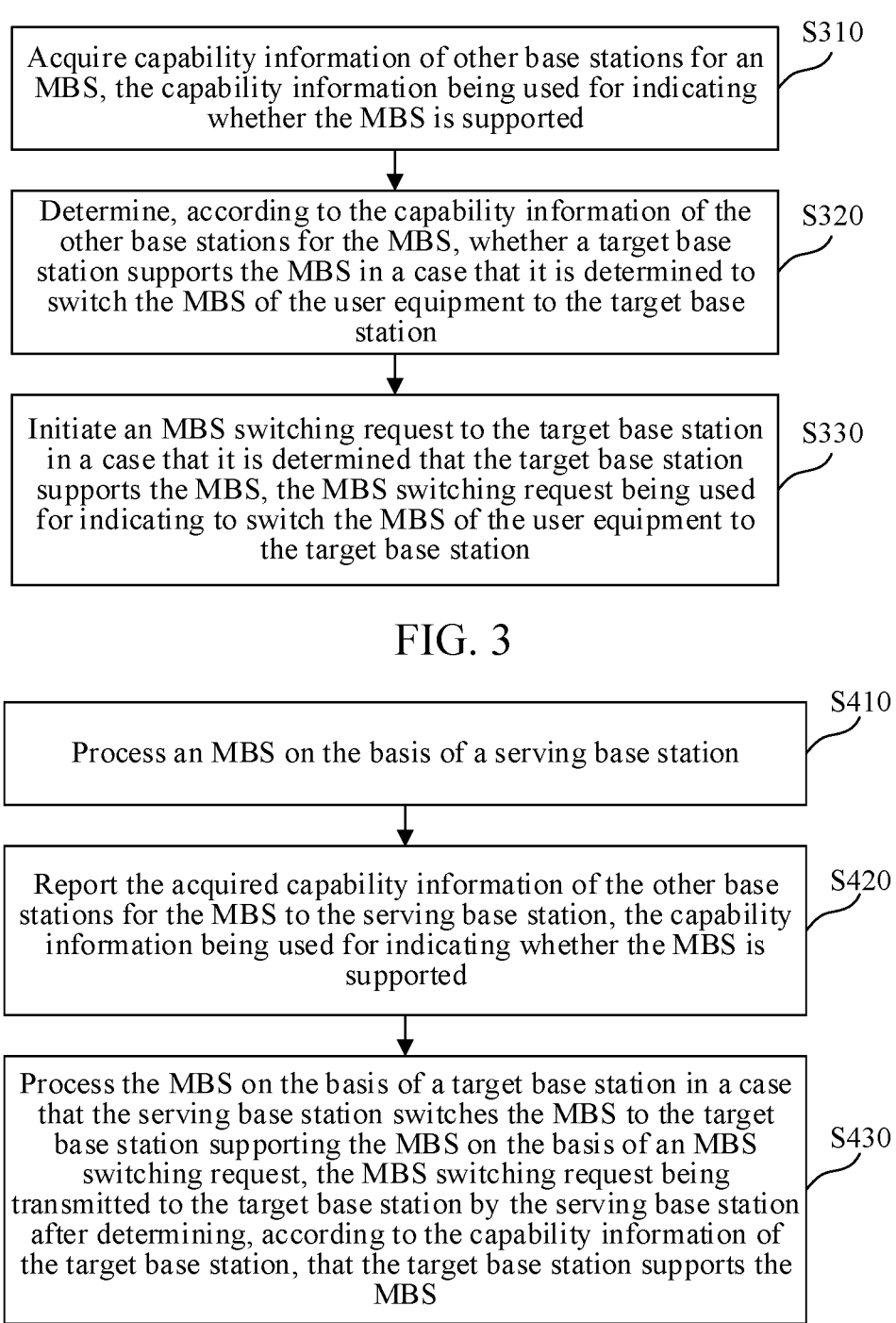

| | |
|---|---|
| Acquire capability information of other base stations for an MBS, the capability information being used for indicating whether the MBS is supported | S310 |
| Determine, according to the capability information of the other base stations for the MBS, whether a target base station supports the MBS in a case that it is determined to switch the MBS of the user equipment to the target base station | S320 |
| Initiate an MBS switching request to the target base station in a case that it is determined that the target base station supports the MBS, the MBS switching request being used for indicating to switch the MBS of the user equipment to the target base station | S330 |

FIG. 3

| | |
|---|---|
| Process an MBS on the basis of a serving base station | S410 |
| Report the acquired capability information of the other base stations for the MBS to the serving base station, the capability information being used for indicating whether the MBS is supported | S420 |
| Process the MBS on the basis of a target base station in a case that the serving base station switches the MBS to the target base station supporting the MBS on the basis of an MBS switching request, the MBS switching request being transmitted to the target base station by the serving base station after determining, according to the capability information of the target base station, that the target base station supports the MBS | S430 |

SUPPORTING SWITCHING BETWEEN BASE STATIONS THAT PROVIDE MULTICAST AND BROADCAST SERVICE

RELATED APPLICATIONS

This application is a continuation of International Application No. PCT/CN2021/116622, entitled "MBS SERVICE SWITCH METHOD AND RELATED DEVICE," and filed on Sep. 6, 2021, which claims priority to Chinese Patent Application No. 202011061451.8, entitled "MBS SWITCHING METHOD AND APPARATUS, COMPUTER-READABLE MEDIUM AND ELECTRONIC DEVICE" and filed on Sep. 30, 2020. The entire disclosures of the prior applications are hereby incorporated by reference.

FIELD OF THE TECHNOLOGY

This application relates to the technical field of computers and communication, including MBS switching.

BACKGROUND OF THE DISCLOSURE

In order to meet the requirements of public security services and broadcast and multicast services in the Internet of vehicles and the Internet of things oriented scenarios in 5G networks, a multicast and broadcast service (MBS) is proposed, and the MBS has also become one of the key technologies in a 5G technology and network evolution. Different from a 4G network, a 5G MBS is based on more cloud and service-oriented basic architecture, and a related switching mechanism needs to be redesigned for an MBS solution.

SUMMARY

Embodiments of this disclosure provide an MBS switching method and a related apparatus, which can realize switching of an MBS.

Other features and advantages of this disclosure become obvious through the following detailed descriptions, or may be partially learned partially through the practice of this disclosure.

In an embodiment, a multicast and broadcast service (MBS) switching method includes acquiring, by a base station serving a user equipment, capability information of other base stations for an MBS, the capability information indicating whether the MBS is supported by each of the other base stations. The method further includes determining, according to the capability information of the other base stations for the MBS, whether a first base station of the other base stations supports the MBS in response to a determination to switch the MBS of the user equipment to the first base station. The method further includes initiating an MBS switching request to the first base station in response to a determination that the first base station supports the MBS, the MBS switching request indicating to switch the MBS of the user equipment from the base station serving the user equipment to the first base station.

In an embodiment, an MBS switching method includes processing, by processing circuitry of user equipment, an MBS provided by a serving base station, and reporting acquired capability information of other base stations for the MBS to the serving base station, the capability information indicating whether the MBS is supported by each of the other base stations. The method further includes processing, by the processing circuitry of the user equipment, the MBS provided by a first base station of the other base stations when the serving base station switches, based on an MBS switching request, the MBS to the first base station, the MBS switching request being transmitted to the first base station by the serving base station after determining, according to capability information, that the first base station supports the MBS.

In an embodiment, an MBS switching apparatus includes processing circuitry configured to acquire capability information of other base stations for an MBS, the capability information indicating whether the MBS is supported by each of the other base stations, and determine, according to the capability information of the other base stations for the MBS, whether a first base station of the other base stations supports the MBS in response to a determination to switch the MBS of user equipment to the first base station. The processing circuitry is further configured to initiate an MBS switching request to the first base station in response to a determination that the first base station supports the MBS, the MBS switching request indicating to switch the MBS of the user equipment from the MBS switching apparatus to the first base station.

In the technical solutions provided by some embodiments of this disclosure, capability information of other base stations for an MBS is acquired, so that whether a target base station (first base station) supports the MBS is determined according to the capability information of the other base stations for the MBS in a case that the MBS of user equipment needs to be switched to the target base station. An MBS switching request is initiated to the target base station in a case that it is determined that the target base station supports the MBS, so as to switch the MBS of the user equipment to the target base station. Therefore, whether the target base station supports the MBS can be determined on the basis of the capability information of the base stations, which can avoid the interrupt of the MBS and the waste of signaling resources caused by blindly initiating a service switching request to a base station that does not support the MBS, and the support of a 5G system for the switching of the MBS is realized.

BRIEF DESCRIPTION OF THE DRAWINGS

FIG. 3 is a flowchart of an MBS switching method according to an embodiment of this disclosure.

FIG. 4 is a flowchart of an MBS switching method according to another embodiment of this disclosure.

DESCRIPTION OF EMBODIMENTS

It is to be noted that: "Plurality of" mentioned in the specification means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

Wireless communication systems of a 2nd generation mobile communication technology (2G), a 3rd generation mobile communication technology (3G), and a 4th generation mobile communication technology (4G) support a multimedia broadcast and multicast service (MBMS). This service is divided into a broadcast service and a multicast service. However, only 2G and 3G systems support the multicast service. A 4G system does not support the multicast service in terms of standards. In addition, the 2G, 3G, and 4G systems all support the broadcast service.

Figure 1:
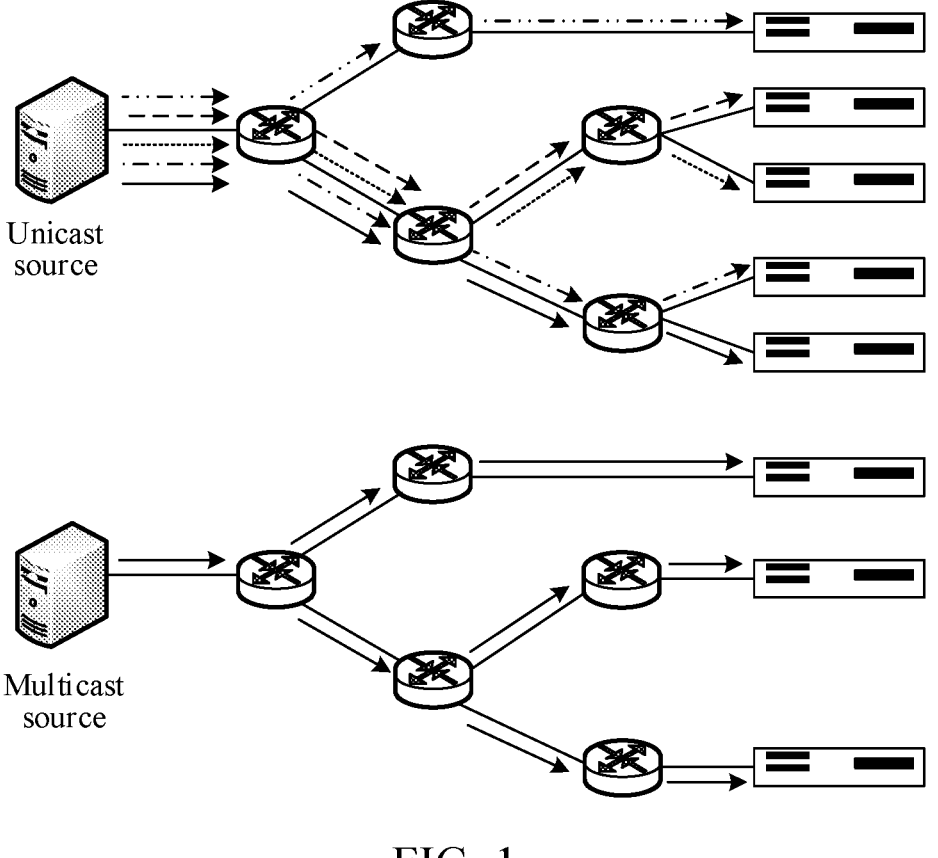
FIG. 1 is a schematic flowchart of data transmission of a unicast communication system and a multicast communication system.

In addition to the multicast and broadcast services, the communication mode between network nodes also includes unicast. "Unicast" is the most common one-to-one communication, which has the advantages that a transmitter can transmit different content to different receivers, but in a case that the transmitter needs to transmit the same content to a plurality of receivers, then a plurality of copies of the same data need to be transmitted end-to-end respectively, so the efficiency is low. Specifically, as shown in FIG. 1, a unicast source (that is, a transmitter) transmits data to a plurality of receivers in a unicast mode, a plurality of copies of the same data need to be transmitted respectively in an end-to-end mode (different line types in FIG. 1 represent different data streams).

"Multicast", which may also be referred to as "multicasting", is that a transmitter transmits the same content to a plurality of receivers. An online video conference and online video on demand are particularly suitable for using a multicast mode, because in a case that a unicast mode is used, how many receivers there are, how many transmission processes there will be, which has extremely low efficiency obviously. In a case that a broadcast mode that does not distinguish a target receiver from other receivers and transmits data to all receivers is used, although the data can be transmitted to all receivers at one time, a purpose of distinguishing a specific data receiver from other receivers cannot be achieved. It can be seen that the purposes of not only transmitting the same data to a plurality of receivers at one time, but also transmitting the data to a specific object only can be achieved by using the multicast mode. Specifically, as shown in FIG. 1, a multicast source (that is, a transmitter) can transmit the same data to a plurality of receivers at one time.

"Broadcast" is also to transmit the same content to a plurality of receivers, but the receiver is not selected during transmission, so there may be a waste of network resources caused by transmitting data to an unnecessary device. In addition, some receivers may not be "interested" in the broadcast content, so the received data packet has to be discarded after the broadcast content is received, thereby also causing a waste of terminal resources.

The basic difference between a broadcast service and a multicast service is that user equipment (UE) of the broadcast service in a system can all participate in the broadcast service without subscribing, while user equipment of the multicast service can only participate in the multicast service after being subscribed and authenticated. Meanwhile, there are many multicast services and broadcast services. For the multicast service, user equipment joins a multicast group of a corresponding service through an Internet protocol (IP) multicast address. The broadcast service is distinguished by different areas, so that there is only one broadcast service in a certain area, and this broadcast service can transmit different services in different time periods.

Figure 2:
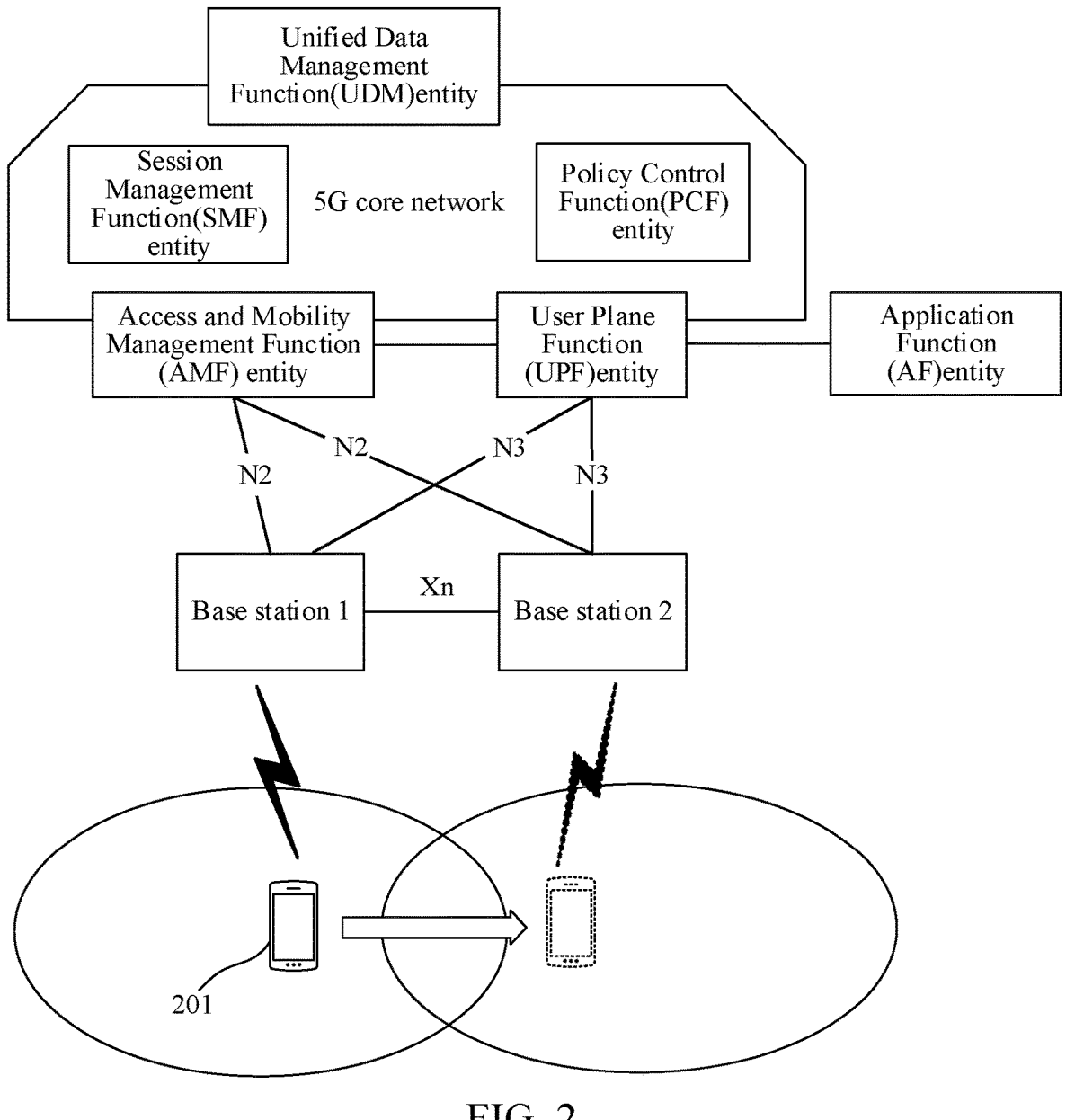
FIG. 2 is a schematic diagram of an application scenario to which the technical solutions of the embodiments of this disclosure is applicable.

In related art, it is proposed to support an MBS in a 5G system, but a switching mechanism for the MBS has not been designed, which affects the support of user equipment for the MBS during moving. Therefore, the embodiments of this disclosure provide a switching solution for the MBS. For example, in exemplary system architecture supporting the MBS as shown in FIG. 2, a base station 1 and a base station 2 are adjacent base stations, and the base station 1 and the base station 2 can be connected through an Xn interface. Of course, it is not necessary for the base station 1 and the base station 2 to be connected through the Xn interface. In other embodiments of this disclosure, the base station 1 and the base station 2 may also not be connected.

Continuing to refer to FIG. 2, the base station 1 and the base station 2 may respectively be connected to an access and mobility management function (AMF) entity through N2 interfaces, and may respectively be connected to a user plane function (UPF) entity through N3 interfaces. In the system architecture as shown in FIG. 2, a session management function (SMF) entity is responsible for a session management function related to the MBS, a policy control function (PCF) entity is responsible for generating a policy related to the MBS, an application function (AF) entity can be integrated with or deployed separately from a content server of the MBS, and a unified data management (UDM) entity is configured to provide the functions of user subscription data access, location registration, etc. Other network elements, such as an operation administration and maintenance (OAM) entity and a network exposure function (NEF) entity, in a network are not shown in the system architecture. However, in actual applications, these network elements may be required.

In an embodiment of this disclosure, a serving base station of user equipment 201 is a base station 1, and the MBS is processed on the basis of the base station 1. The base station 1 can acquire capability information of a base station 2 for an MBS, such as whether the base station 2 supports the MBS, whether the base station 2 supports shared tunnel transmission or dedicated tunnel transmission in an N3 interface, and whether the base station 2 supports point-to-point broadcast or point-to-multipoint broadcast in an air interface. The base station 1 may acquire the information from the base station 2 through the Xn interface, or may acquire the information through a report of user equipment (such as the user equipment 201 as shown in FIG. 2, or other user equipment not shown), or may acquire the information on the basis of configuration of the OAM entity.

The user equipment 201 will perform cell measurement during moving, and reports a cell measurement report to the base station 1. In a case that the base station 1 determines that an MBS of the user equipment 201 (an MBS of the user equipment 201 may be a service processed by an MBS transmission group that the user equipment 201 joins) needs to be switched to the base station 2 due to the movement of the user equipment 201, then whether the base station 2 supports the MBS will be determined according to the capability information of the base station 2. In a case that the base station 2 supports the MBS, then the base station 1 can initiate an MBS switching request to the base station 2 to switch the MBS of the user equipment 201 to the base station 2, so that the user equipment 201 can continue processing the MBS on the basis of the base station 2.

In an embodiment of this disclosure, communication negotiation can also be performed between the user equipment 201 and the AF entity, so as to determine whether to perform data forwarding treatment according to the MBS of the user equipment 201, and determine whether the base station 2 uses the shared tunnel transmission or dedicated tunnel transmission in the N3 interface and uses the point-to-point broadcast or point-to-multipoint broadcast in the air interface after switching. Then, the AF entity configures determined switching policy information to the base station 1 through the AMF entity or the SMF entity, and the base station 1 adds the switching policy information to the processing related to the MBS switching on the basis of capability information of the base station 2. The AMF entity or the SMF entity may be referred to as a core network device.

In an embodiment of this disclosure, in a case that the data forwarding treatment does not need to be performed (for example, the MBS is a live streaming service), then switching is directly performed according to a switching policy. In a case that the data forwarding treatment needs to be performed (for example, the MBS is a software download-ing or upgrading task), then the data forwarding treatment needs to be performed between the base station 1 and the base station 2, so as to ensure the data integrity of the MBS. Meanwhile, for a specific real-time multimedia service, during switching the MBS, the primary factor affecting the user experience is to receive real-time data on the base station after switching as soon as possible, while data forwarding and recovery before or during the switching are not important. In this case, network resources can be saved and a switching process can be accelerated by skipping data forwarding.

Implementation details of the technical solutions of the embodiments of this disclosure are described below in detail.

FIG. 3 is a flowchart of an MBS switching method according to an embodiment of this disclosure. The MBS switching method can be performed by a base station, and the base station may be a serving base station configured to provide services for user equipment. Referring to FIG. 3, the MBS switching method includes at least step S310 to step S330, which are described in detail as follows.

Step S310. Acquire capability information of other base stations for an MBS. The capability information is used for indicating whether the MBS is supported. For example, capability information of other base stations for an MBS is acquired by processing circuitry of a base station serving a user equipment, the capability information indicating whether the MBS is supported by each of the other base stations.

In an embodiment of this disclosure, the other base stations may be a base station adjacent to a position where the serving base station of the user equipment is located.

In an embodiment of this disclosure, the serving base station acquiring the capability information of the other base stations for the MBS may be receiving the capability infor-mation, reported by the user equipment, of the other base stations for the MBS. For example, the user equipment may receive system information broadcast by a neighboring base station of a current serving base station and acquire capability information of the neighboring base station for an MBS through the system information.

In an embodiment of this disclosure, the serving base station acquiring the capability information of the other base stations for the MBS may be acquiring the capability infor-mation of the other base stations for the MBS through a communication link established with the other base stations. That is, the serving base station can establish a communi-cation link with a neighboring base station through an Xn interface, so as to acquire the capability information of the other base stations for the MBS.

In an embodiment of this disclosure, the serving base station acquiring the capability information of the other base stations for the MBS may be acquiring the capability infor-mation, configured by an operation administration and main-tenance entity, of the other base stations for the MBS. For example, the operation administration and maintenance entity can pre-configure the capability information of the other base stations for the MBS to the serving base station.

It is to be noted that: the serving base station may acquire the capability information of the other base stations for the MBS in one or more of the above-mentioned modes.

In an embodiment of this disclosure, in addition to indi-cating whether the MBS is supported, the foregoing capa-bility information may further indicate at least one of the following: whether to support a shared tunnel transmission mode or a dedicated tunnel transmission mode in an N3 interface, and whether to support point-to-point broadcast or point-to-multipoint broadcast in an air interface. The capa-bility information can be used for selecting switching policy information of a target base station during MBS switching. For example, in a case that the target base station supports the shared tunnel transmission mode in the N3 interface, then the shared tunnel transmission mode can be used in the N3 interface of the target base station after the MBS is switched to the target base station.

Step S320. Whether the target base station supports the MBS is determined according to the capability information of the other base stations for the MBS in a case that it is determined to switch the MBS of the user equipment to the target base station. For example, it is determined, according to the capability information of the other base stations for the MBS, whether a first base station of the other base stations supports the MBS in response to a determination to switch the MBS of the user equipment to the first base station.

In an embodiment of this disclosure, a cell measurement report reported by the user equipment can be received, and then whether the MBS of the user equipment is switched to the target base station is determined according to the cell measurement report, that is, a mode of determining to switch the MBS of the user equipment to the target base station may be determining to switch the MBS of the user equipment to the target base station according to the cell measurement report. The technical solution of the embodiment is that the switching is triggered on the basis of the movement of the user equipment. For example, the serving base station deter-mines that the signal intensity, measured by the user equip-ment, of a certain base station adjacent to the serving base station is increasing according to the cell measurement report reported by the user equipment, then it may be determined that the user equipment will move to the cov-erage of the base station, and then the switching can be triggered.

In an embodiment of this disclosure, a signaling message transmitted by a core network device can be received, and whether the MBS of the user equipment is switched to a target base station is determined according to the signaling message, that is, a mode of determining to switch the MBS of the user equipment to the target base station may be determining to switch the MBS of the user equipment to the target base station according to the signaling message. For example, the core network device can determine whether the MBS of the user equipment needs to be switched from the serving base station to another base station according to the information, such as a load condition of the serving base station and session parameters corresponding to a service flow. In a case that the MBS of the user equipment needs to be switched, the core network device transmits a signaling message to the serving base station. The core network device in the embodiment may be an AMF or an SMF.

In an embodiment of this disclosure, in a case that the capability information of the other base stations for the MBS acquired by the serving base station does not include the capability information of the target base station, the serving base station can transmit a notification message to the user equipment. The notification message is used for notifying the user equipment to report the capability information of the target base station for the MBS. The user equipment can acquire the capability information of the target base station for the MBS, for example, acquire the capability information of the target base stations for the MBS by receiving the system information broadcast by the target base station, and then report the acquired capability information of the target base station for the MBS to the serving base station, so that the serving base station determines whether the target base station supports the MBS according to the capability information of the target base station for the MBS.

Continuing to refer to FIG. 3. Step S330. Initiate an MBS switching request to the target base station in a case that it is determined that the target base station supports the MBS. The MBS switching request is used for indicating to switch the MBS of the user equipment to the target base station. For example, an MBS switching request to the first base station is initiated in response to a determination that the first base station supports the MBS, the MBS switching request indicating to switch the MBS of the user equipment from the base station serving the user equipment to the first base station.

In an embodiment of this disclosure, in a case that whether the target base station supports the shared tunnel transmission mechanism or the dedicated tunnel transmission mechanism in the N3 interface is acquired, the serving base station can also indicate the tunnel transmission mode, that is, the shared tunnel transmission mode or the dedicated tunnel transmission mode, used by the target base station in the N3 interface through the MBS switching request.

In an embodiment of this disclosure, in a case that whether the target base station supports the point-to-point broadcast or the point-to-multipoint broadcast in the air interface is acquired, the serving base station can also indicate the broadcast mode, that is, the point-to-point broadcast mode or the point-to-multipoint broadcast mode, used by the target base station in the air interface through the MBS switching request.

In an embodiment of this disclosure, in a case that the serving base station receives an indication information, transmitted by the core network device, indicating whether to perform data forwarding for the MBS, the serving base station can transmit the indication information to the target base station, so as to indicate whether the target base station needs to perform the data forwarding. In some cases, the serving base station can add the indication information to the MBS switching request and transmit the MBS switching request added with the indication information to the target base station. Moreover, the serving base station can receive the indication information, transmitted by the core network device, before or during switching the MBS.

Specifically, before switching the MBS, the indication information can be configured to the core network device or a base station as a parameter of UE context. After the switching of the MBS, the indication information will be transferred to the target base station, that is, a new serving base station, together with the context In an embodiment of this disclosure, in a case that the serving base station receives a policy adjustment instruction, transmitted by the core network device, for the MBS, the serving base station can adjust a configuration message for the MBS on the basis of the policy adjustment instruction. The policy adjustment instruction includes at least one of the following: adjusting a tunnel transmission mode used in the N3 interface, and adjusting a broadcast mode used in the air interface. For example, the serving base station uses the shared tunnel transmission mode in the N3 interface for the MBS, and in a case that the core network device needs to adjust the tunnel transmission mode used by the serving base station in the N3 interface, that is, adjust the shared tunnel transmission mode to the dedicated tunnel transmission mode, the core network device can transmit a policy adjustment instruction to the serving base station.

FIG. 3 describes the MBS switching method of the embodiments of this disclosure from the perspective of a base station. The MBS switching method of the embodiments of this disclosure will be described in detail below from the perspective of user equipment in combination with FIG. 4.

FIG. 4 is a flowchart of an MBS switching method according to an embodiment of this disclosure. The MBS switching method can be performed by user equipment. Referring to FIG. 4, the MBS switching method includes at least step S410 to step S430, which are described in detail as follows.

Step S410. Process an MBS on the basis of a serving base station. For example, an MBS provided by a serving base station is processed by processing circuitry of user equipment.

In an embodiment of this disclosure, a process that the user equipment processes the MBS on the basis of the serving base station may be joining a certain MBS group to receive MBS data transmitted by the serving base station. For example, the MBS data may be multimedia data (such as live streaming data and news data), software download package data, software update package data, etc.

Step S420. Report acquired capability information of other base stations for the MBS to the serving base station. The capability information is used for indicating whether the MBS is supported. For example, acquired capability information of other base stations for the MBS is reported to the serving base station, the capability information indicating whether the MBS is supported by each of the other base stations.

In an embodiment of this disclosure, each base station can implicitly or explicitly indicate the capability information for the MBS through system information, and then the user equipment can acquire the capability information of each base station for the MBS through the system information broadcast by each base station.

In an embodiment of this disclosure, the user equipment may report acquired capability information of all other base stations for the MBS to the serving base station.

In an embodiment of this disclosure, the user equipment may report acquired capability information of a designated base station of the other base stations for the MBS to the serving base station. The designated base station includes at least one of the following: a base station with a signal intensity greater than or equal to a set value of the other base stations, or a base station supporting the MBS of the other base stations. That is, in the embodiment, the user equipment can screen first according to the information of the base stations, and then report the capability information of a screened designated base station for the MBS to the serving base station.

Continuing to refer to FIG. 4. Step S430. Process the MBS on the basis of a target base station in a case that the serving base station switches, on the basis of an MBS switching request, the MBS to the target base station supporting the MBS. The MBS switching request is transmitted to the target base station by the serving base station after determining, according to the capability information of the target base station, that the target base station supports the MBS. For example, the MBS provided by a first base station of the other base stations is processed by processing circuitry of the user equipment when the serving base station switches, based on an MBS switching request, the MBS to the first base station. The MBS switching request is transmitted to the first base station by the serving base station after determining, according to capability information, that the first base station supports the MBS.

In an embodiment of this disclosure, the serving base station can determine whether the target base station supports the MBS on the basis of the acquired capability information of each base station for the MBS. In a case that the capability information of each base station for the MBS acquired by the serving base station does not include the capability information of the target base station for the MBS, a notification message can be transmitted to the user equipment. The notification message is used for notifying the user equipment to report the capability information of the target base station for the MBS. The user equipment acquires the capability information of the target base station for the MBS after receiving the notification message, and then reports the capability information of the target base station for the MBS to the serving base station for the serving base station to determine whether the target base station supports the MBS.

In an embodiment of this disclosure, the user equipment can also perform communication negotiation with an application function entity corresponding to the MBS, so as to determine switching policy information of the MBS. Then, the switching policy information is configured, by the AF entity, to the serving base station through a core network device before or during switching the MBS. For example, the AF entity may directly transmit the policy switching information to the PCF entity, or the AF entity transmits the policy switching information to the PCF entity through an NEF entity. Then, the policy switching information is transmitted to the AMF entity and/or the SMF entity by the PCF entity, and is configured to the serving base station through the AMF entity and/or the SMF entity. In a possible implementation mode, the above-mentioned switching policy information may include at least one of the following: whether data forwarding treatment is performed between base stations before and after switching, whether a shared tunnel transmission mechanism or a dedicated tunnel transmission mechanism is used in the N3 interface during processing the MBS by the base station after switching, or whether point-to-point broadcast or point-to-multipoint broadcast is used in the N3 interface during processing the MBS by the base station after switching.

It is to be noted that, whether data forwarding treatment is performed between base stations before and after switching can be determined according to the type of the MBS of the user equipment. For example, in a case that the type of the MBS belongs to services with a low packet loss requirement, such as a live streaming service or a real-time interactive service, the data forwarding treatment can be skipped. In a case that the type of the MBS belongs to services with a high packet loss requirement, such as a software package downloading/updating service, a map updating service, and a planning path updating service, the data forwarding treatment is performed to ensure the data integrity of the MBS.

The technical solutions of the embodiments of this disclosure have been described above from the perspective of a base station and user equipment respectively, that is, the technical solutions of the embodiments of this disclosure mainly provide a wireless network switching mechanism for 5G MBS. Specifically, the relevant capability of actively determining whether a potential target base station supports a 5G MBS during switching is realized by introducing new MBS related characteristic parameters to a 5G air interface, an interface between base stations, and an interface between a base station and a core network. Meanwhile, in some embodiments, communication negotiation between UE and an AF entity may also be introduced during switching, so as to select a proper switching mechanism according to the requirements of a service on a packet loss characteristic, thereby realizing effective supporting for the MBS switching in a 5G network.

Figure 5:
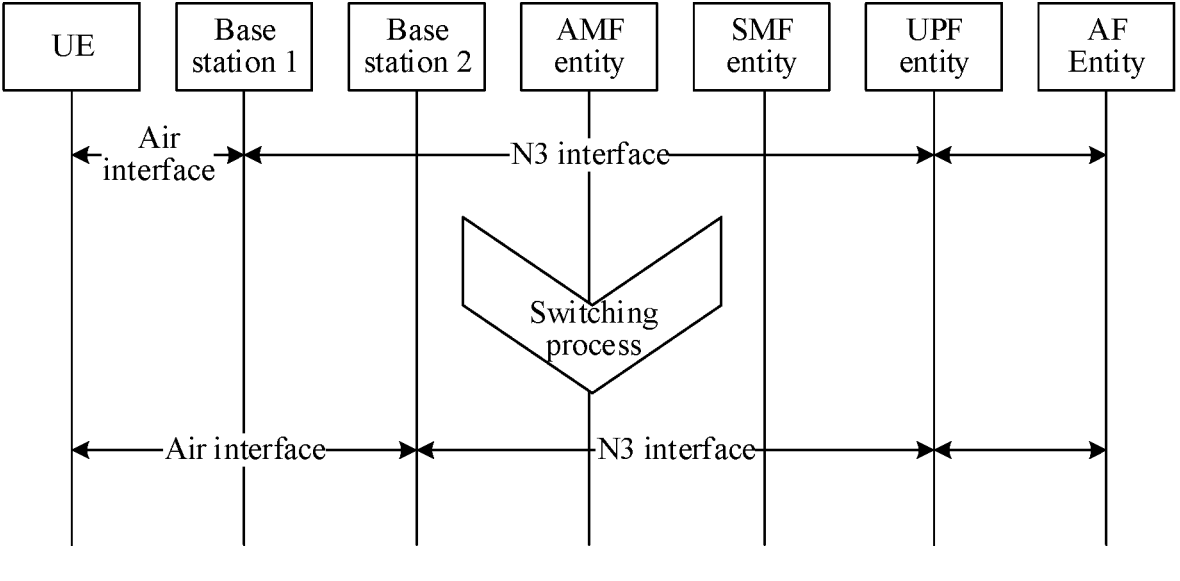
FIG. 5 is a schematic diagram of an MBS switching process according to an embodiment of this disclosure.

In a case, as shown in FIG. 5, the switching process of an MBS of UE is essentially to switch a 5G data radio bearer of an air interface and a tunnel of an N3 interface of a base station, so that the service data from an AF entity to the UE can continue. For the embodiment as shown in FIG. 5, an air interface between the UE and the base station 1 is switched to an air interface between the UE and the base station 2, and an N3 interface between the base station 1 and a UPF entity is switched to an N3 interface between the base station 2 and the UPF entity.

In an embodiment of this disclosure, the switching of an MBS may be assisted through an enhanced automatic neighbor relation (ANR) mechanism. Generally, a base station can learn capability information of other base stations for a 5G MBS by the methods of UE report and/or communication between base stations and/or OAM entity configuration, etc. The capability information includes: whether the base station supports an MBS; whether the base station supports a shared tunnel transmission mechanism or a dedicated tunnel mechanism in an N3 interface; and whether the base station supports point-to-multipoint broadcast or point-to-point broadcast in an air interface.

Figure 6:
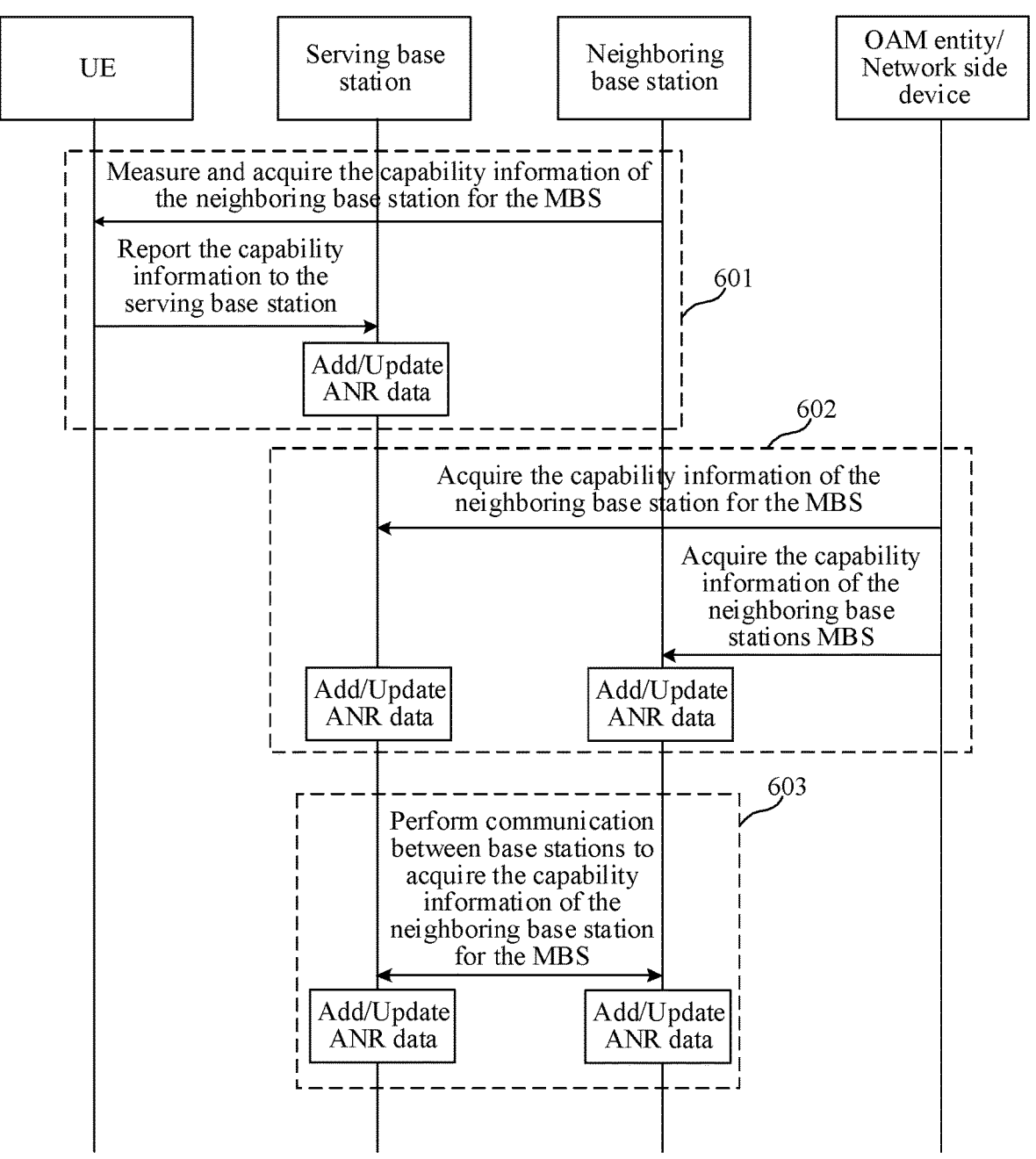
FIG. 6 is a schematic diagram of an enhanced ANR mechanism according to an embodiment of this disclosure.

As shown in FIG. 6, the enhanced ANR mechanism in the embodiments of this disclosure may include some or all mechanisms in 601, 602, and 603. In 601 as shown in FIG. 6, UE measures and acquires capability information of a neighboring base station for an MBS, and then reports to the serving base station, so that the serving base station adds/updates maintained ANR data. In 602 as shown in FIG. 6, each base station acquires the capability information of the neighboring base station for the MBS from an OAM entity/network side device, and each base station adds/updates the maintained ANR data. The network side device may be a core network device. In 603 as shown in FIG. 6, the base stations acquire the capability information of each neighboring base station for the MBS through communication, and each base station adds/updates the maintained ANR data.

In order to support the above-mentioned solution, the user equipment and the base stations need to support corresponding protocols. For example, a supporting base station can implicitly or explicitly broadcast the foregoing capability information for the MBS through system information; and the user equipment can inform the serving base station of the capability information of the neighboring base station for the MBS through a UE reporting mechanism to assist the serving base station in making a decision.

The enhanced ANR mechanism in the above-mentioned embodiments of this disclosure can enable the serving base station to predict whether the target base station supports the 5G MBS and which MBS transmission modes are supported in the air interface and the N3 interface respectively in advance, so as to configure corresponding switching policy information.

In an embodiment of this disclosure, UE can perform communication negotiation with the AF entity during switching, and a reasonable switching policy is selected according to the requirements of the MBS on the packet loss characteristic, a bearable switching time, etc., so as to effectively support the switching of the MBS in the 5G network. Specifically, requirements for the data forwarding treatment are different in a case that MBS types are different, so in order to save network resources, for an 5G MBS that does not need data forwarding, the AF entity can notify a 5G core network device to skip the data forwarding for the MBS after interactive confirmation of the UE and the AF entity, so as to simplify the data forwarding treatment between a source base station (a serving base station of the user equipment before switching) and a target base station. In some cases, core networks corresponding to the source base station and the target base station may be the same.

In an embodiment of this disclosure, the AF entity can configure a policy about whether data forwarding needs to be performed for each MBS. For example, the AF entity can configure corresponding policies to the AMF entity, the SMF entity, and the UE through the PCF entity, and can update the configured policies. Meanwhile, the specific configuration process may occur before or during switching of the MBS.

Figure 7:
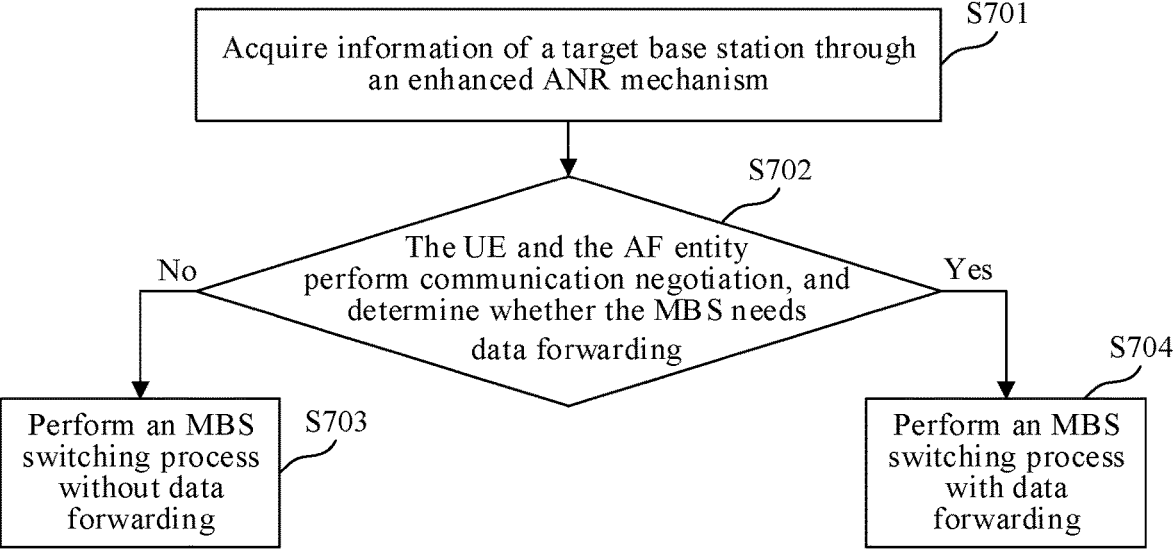
FIG. 7 is a flowchart of an MBS switching method according to an embodiment of this disclosure.

FIG. 7 is a flowchart of an MBS switching method according to an embodiment of this disclosure, which specifically includes the following steps:

Step S701. Acquire information of a target base station through an enhanced ANR mechanism.

Step S702. Perform communication negotiation between UE and an AF entity, so as to determine whether an MBS needs the data forwarding treatment. In a case that the MBS needs the data forwarding treatment, step S704 is performed. In a case that the MBS does not need to the data forwarding treatment, step S703 is performed.

In an embodiment of this disclosure, in a case that the MBS belongs to services with a low packet loss requirement, such as a live streaming service or a real-time interactive service, the data forwarding treatment can be skipped. In a case that the MBS belongs to services with a high packet loss requirement, such as a software package downloading/updating service, a map updating service, and a planning path updating service, the data forwarding treatment is performed to ensure the data integrity of the MBS.

Step S703. Perform MBS switching without data forwarding.

Step S704. Perform MBS switching with data forwarding.

It is to be noted that, no matter in the MBS switching process with data forwarding, or the MBS switching process without data forwarding, the core network device or the source base station can determine a switching policy according to the tunnel transmission mode (a shared tunnel transmission mode or a dedicated tunnel transmission mode) supported in the N3 interface and a broadcast mode (a point-to-point mode or a point-to-multipoint mode) supported in the air interface by the target base station, for example, which MBS transmission modes are respectively supported in the air interface and the N3 interface after switching.

Figure 8:
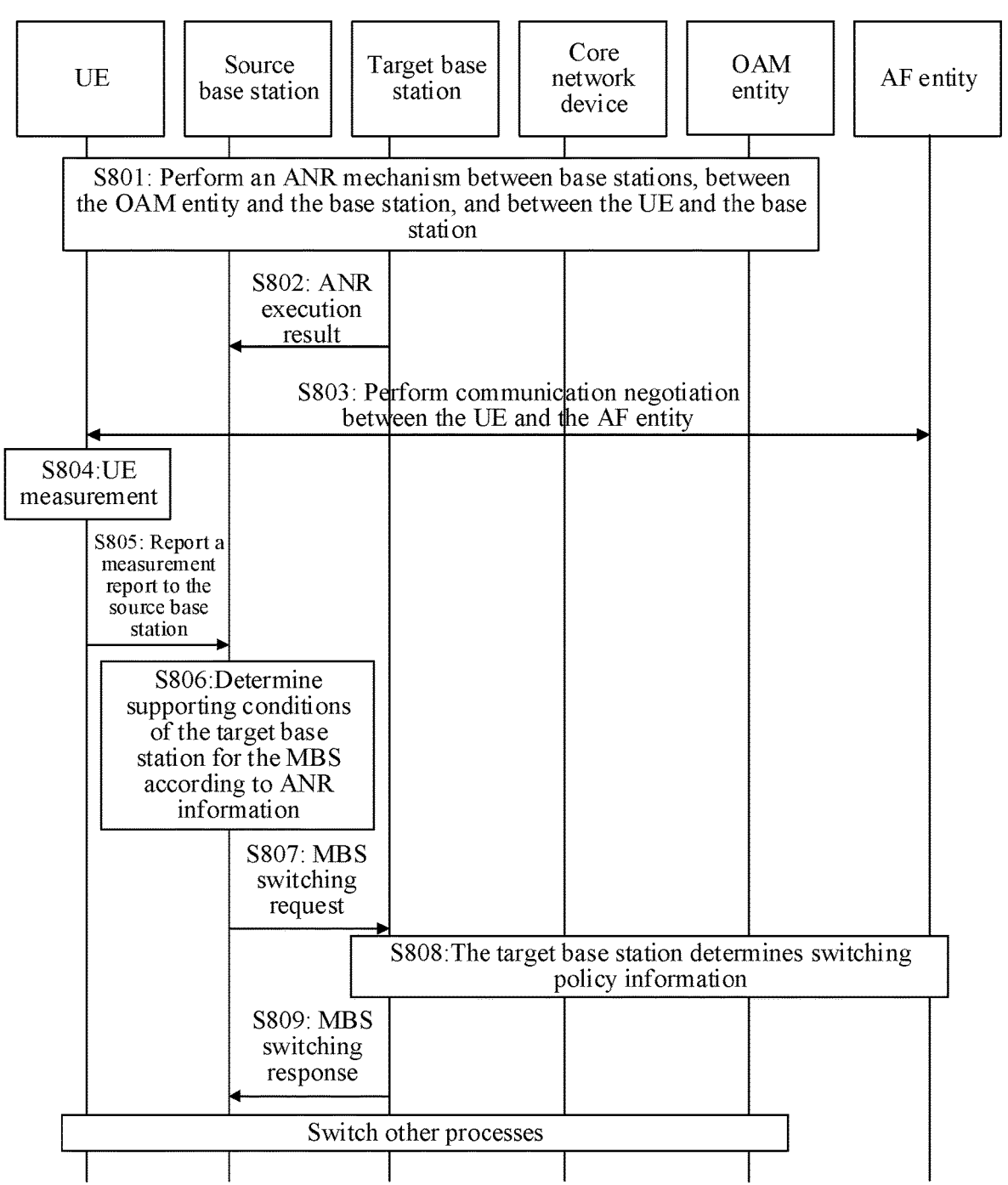
FIG. 8 is a flowchart of an MBS switching method according to another embodiment of this disclosure.

In an embodiment of this disclosure, MBS switching may be triggered by the mobility of user equipment, or may be triggered by a non-mobility reason of a network side device, etc. The switching triggered by the non-mobility reason of the network side device, etc. includes: a load balancing policy of a network, the change of session parameters corresponding to a service flow, etc. The technical solutions of the above-mentioned embodiments of this disclosure are applicable for the above-mentioned two cases. The switching triggered by the mobility of user equipment will be described below with reference to FIG. 8, which mainly includes the following steps:

Step S801. UE establishes an MBS session at a source base station to process an MBS. Before switching, an ANR mechanism may be performed between base stations, between an OAM entity and the base stations, and between the UE and the base stations, so that capability information of a neighboring base station for the MBS can be obtained between the base stations, which includes, but is not limited to: whether the base station supports the MBS; whether the base station supports a shared tunnel transmission mechanism or a dedicated tunnel mechanism in an N3 interface; and whether the base station supports point-to-multipoint broadcast or point-to-point broadcast in an air interface.

Step S802. The source base station obtains an ANR execution result, that is, the source base station learns that whether a target base station supports the MBS, whether the target station supports the dedicated tunnel transmission mode or the shared tunnel transmission mode in the N3 interface, and whether the target base station supports point-to-point (PTP) or point-to-multipoint (PTMP)) in the air interface.

Step S803. The UE performs communication negotiation with the AF entity before switching, so as to determine switching policy information, such as, whether data forwarding is needed during switching, whether the shared tunnel transmission mode or the dedicated tunnel transmission mode is used in the N3 interface after switching, and whether the point-to-multipoint broadcast mode or the point-to-point broadcast mode is used in the air interface after switching.

Step S804. The UE moves and discovers a neighboring base station through a measurement mechanism.

Step S805. The UE reports a measurement report to the serving base station (that is, the source base station). The measurement report may include a physical cell identifier (PCI) of the target base station.

In an embodiment of this disclosure, in a case that the serving base station has learned the capability information of all neighboring base stations for the MBS through the ANR mechanism, the information, for example whether a neighboring base station supports the MBS, can be determined according to the PCI reported by the UE. In a case that the serving base station has not learned the capability information of all neighboring base stations for the MBS through the ANR mechanism, the ANR mechanism can be started. For example, the UE can be notified to acquire the capability information from the system information broadcast of the neighboring base station or in other modes, and then report the capability information to the serving base station.

In an embodiment of this disclosure, the UE may report the information of some or all cells to the serving base station, or perform screening (such as sorting according to the signal intensity of the neighboring base station or screening according to whether the neighboring base station supports the MBS, etc.) and then report to the serving base station.

Step S806. The source base station determines the supporting conditions of the target base station for the MBS according to ANR information.

Step S807. In a case that the source base station determines that the target base station supports the MBS, the source base station initiates an MBS switching request. The MBS switching request may carry MBS switching indication information, which includes: whether data forwarding is performed, whether the shared tunnel transmission mode or the dedicated tunnel transmission mode is used in the N3 interface after switching, whether the point-to-multipoint broadcast mode or the point-to-point broadcast mode is used in the air interface after switching, etc.

In an embodiment of this disclosure, the MBS switching indication information carried in the MBS switching request may be determined by the source base station, or may also be indicated to the source base station by the AMF entity.

Step S808. The target base station determines the switching policy information, which includes: whether data forwarding is performed, whether the shared tunnel transmission mode or the dedicated tunnel transmission mode is used in the N3 interface after switching, whether the point-to-multipoint broadcast mode or the point-to-point broadcast mode is used in the air interface after switching, etc.

It is to be noted that: in a case that the MBS switching request transmitted by the source base station does not carry the switching policy information, the target base station can actively generate a corresponding configuration message, and can adjust according to a policy adjustment instruction transmitted by a core network device subsequently.

Step S809. The target base station transmits a switching response to the source base station.

The technical solutions of the above-mentioned embodiments of this disclosure realize the relevant capability of actively determining whether a potential target base station supports a 5G MBS during switching by introducing new MBS related characteristic parameters to a 5G air interface, an interface between base stations, and an interface between a base station and a core network. Meanwhile, in some embodiments, communication negotiation between UE and an AF entity may also be introduced during switching, so as to select a proper switching mechanism according to the requirements of a service on a packet loss characteristic, thereby avoiding resource waste caused by undifferentiated data forwarding of services, and realizing effective support for MBS switching in a 5G network.

The following describes apparatus embodiments of this disclosure, which can be used for performing the MBS switching method in the foregoing embodiments of this disclosure. For details not disclosed in the apparatus embodiments of this disclosure, reference may be made to the foregoing embodiments of the MBS switching method of this disclosure.

Figure 9:
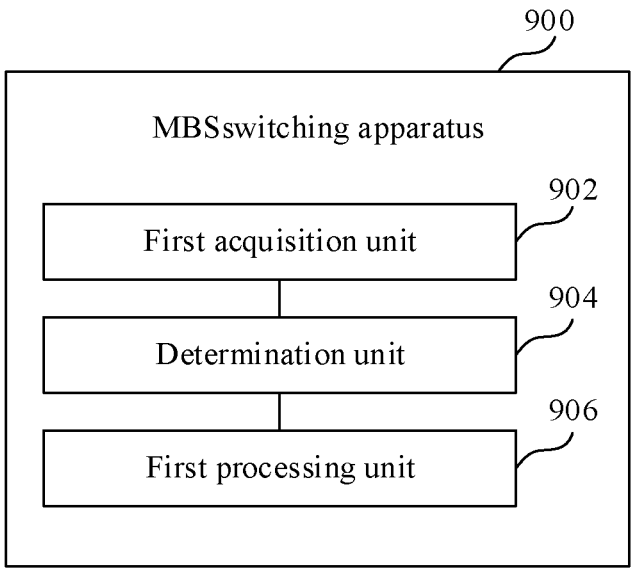
FIG. 9 is a block diagram of an MBS switching apparatus according to an embodiment of this disclosure.

FIG. 9 is a block diagram of an MBS switching apparatus according to an embodiment of this disclosure. The MBS switching apparatus may be arranged in a base station. The base station may be a serving base station configured to provide services for user equipment.

Referring to FIG. 9, the MBS switching apparatus 900 according to an embodiment of this disclosure includes: a first acquisition unit 902, a determination unit 904, and a first processing unit 906.

The first acquisition unit 902 is configured to acquire capability information of other base stations for an MBS, the capability information being used for indicating whether the MBS is supported; the determination unit 904 is configured to determine, according to the capability information of the other base stations for the MBS, whether a target base station supports the MBS in a case that it is determined to switch the MBS of the user equipment to the target base station; and the first processing unit 906 is configured to initiate an MBS switching request to the target base station in a case that it is determined that the target base station supports the MBS, the MBS switching request being used for indicating to switch the MBS of the user equipment to the target base station.

In some embodiments of this disclosure, based on the foregoing solutions, the first acquisition unit 902 acquires the capability information of the other base stations for the MBS in at least one of the following modes:

receiving the capability information, reported by the user equipment, of the other base stations for the MBS;

acquiring the capability information of the other base stations for the MBS through a communication link established with the other base stations; and acquiring the capability information, configured by an operation administration and maintenance entity, of the other base stations for the MBS.

In some embodiments of this disclosure, based on the foregoing solutions, the capability information is further used for indicating at least one of the following: whether to support a shared tunnel transmission mode or a dedicated tunnel transmission mode in an N3 interface, and whether to support point-to-point broadcast or point-to-multipoint broadcast in an air interface.

In some embodiments of this disclosure, based on the foregoing solutions, in a case that the capability information is further used for indicating whether to support a shared tunnel transmission mechanism or a dedicated tunnel transmission mechanism in an N3 interface, the MBS switching request is further used for indicating a tunnel transmission mode used by the target base station in the N3 interface.

In some embodiments of this disclosure, based on the foregoing solutions, in a case that the capability information is further used for indicating whether to support point-to-point broadcast or point-to-multipoint broadcast in an air interface, the MBS switching request is further used for indicating a broadcast mode used by the target base station in the air interface.

In some embodiments of this disclosure, based on the foregoing solutions, in a case that capability information of the other base stations for the MBS does not include the capability information of the target base station, the MBS switching apparatus 900 further includes: a transmission unit, configured to transmit a notification message to the user equipment, the notification message being used for notifying the user equipment to report capability information of the target base station for the MBS; and a first receiving unit, configured to receive the capability information, reported by the user equipment, of the target base station for the MBS; and the determination unit is further configured to determine whether the target base station supports the MBS according to the capability information of the target base station for the MBS.

In some embodiments of this disclosure, based on the foregoing solutions, the MBS switching apparatus 900 further includes: a second receiving unit, configured to receive a cell measurement report reported by the user equipment; and the determination unit is further configured to determine to switch the MBS of the user equipment to the target base station according to the cell measurement report.

In some embodiments of this disclosure, based on the foregoing solutions, the MBS switching apparatus 900 further includes: a third receiving unit, configured to receive a signaling message transmitted by a core network device; and the determination unit is further configured to determine to switch the MBS of the user equipment to the target base station according to the signaling message.

In some embodiments of this disclosure, based on the foregoing solutions, the first processing unit 906 is further configured to: receive indication information, transmitted by the core network device, indicating whether to perform data forwarding for the MBS before or during switching the MBS; and transmit the indication information to the target base station.

In some embodiments of this disclosure, based on the foregoing solutions, the first processing unit 906 is further configured to: adjust a configuration message for the MBS on the basis of a policy adjustment instruction in a case that the policy adjustment instruction, transmitted by the core network device, for the MBS is received, the policy adjustment instruction including at least one of the following: adjusting a tunnel transmission mode used in the N3 interface, and adjusting a broadcast mode used in the air interface.

Figure 10:
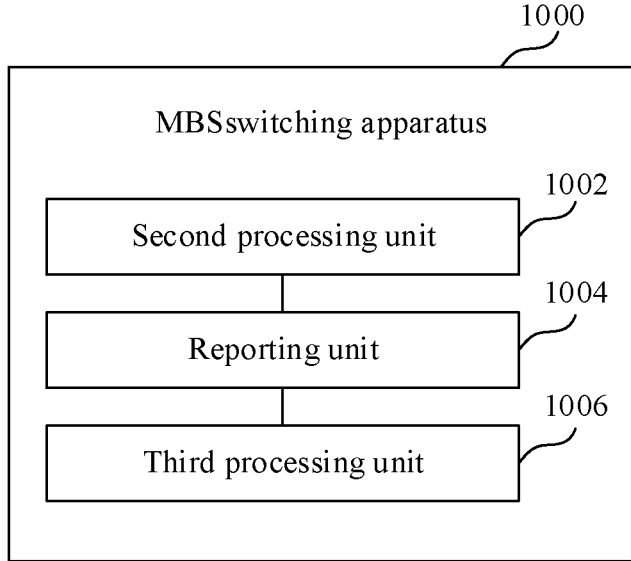
FIG. 10 is a block diagram of an MBS switching apparatus according to another embodiment of this disclosure.

FIG. 10 is a block diagram of an MBS switching apparatus according to an embodiment of this disclosure. The MBS switching apparatus may be arranged in user equipment.

Referring to FIG. 10, the MBS switching apparatus 1000 according to an embodiment of this disclosure includes: a second processing unit 1002, a reporting unit 1004, and a third processing unit 1006.

The second processing unit 1002 is configured to process an MBS on the basis of a serving base station; the reporting unit 1004 is configured to report acquired capability information of other base stations for the MBS to the serving base station, the capability information being used for indicating whether the MBS is supported; and the third processing unit 1006 is configured to process the MBS on the basis of a target base station in a case that the serving base station switches, on the basis of an MBS switching request, the MBS to the target base station supporting the MBS. The MBS switching request is transmitted to the target base station by the serving base station after determining, according to capability information of the target base station, that the target base station supports the MBS.

In some embodiments of this disclosure, based on the foregoing solutions, the switching apparatus 1000 further includes: a second acquisition unit, configured to acquire capability information of the target base station for the MBS in a case that a notification message transmitted by the serving base station is received, the notification message being used for notifying the user equipment to report the capability information of the target base station for the MBS; and the reporting unit 1004 is further configured to: report the capability information of the target base station for the MBS to the serving base station for the serving base station to determine whether the target base station supports the MBS.

In some embodiments of this disclosure, based on the foregoing solutions, the reporting unit 1004 is further configured to: receive system information broadcast by the other base stations, the system information indicating the capability information of the other base stations for the MBS in an implicit or explicit mode; and acquire the capability information of the other base stations for the MBS according to the system information.

In some embodiments of this disclosure, based on the foregoing solutions, the switching apparatus 1000 further includes: a negotiation unit, configured to perform communication negotiation with an application function entity corresponding to the MBS to determine switching policy information of the MBS, the switching policy information being configured, by the application function entity, to the serving base station through a core network device before or during switching the MBS.

The switching policy information includes at least one of the following: whether data forwarding processing is performed between base stations before and after switching, whether a shared tunnel transmission mechanism or a dedicated tunnel transmission mechanism is used in the N3 interface during processing the MBS by the base station after switching, or whether point-to-point broadcast or point-to-multipoint broadcast is used in the N3 interface during processing the MBS by the base station after switching.

In some embodiments of this disclosure, based on the foregoing solutions, the reporting unit 1004 is configured to: report acquired capability information of all other base stations for the MBS to the serving base station.

In some embodiments of this disclosure, based on the foregoing solutions, the reporting unit 1004 is configured to: report acquired capability information of a designated base station of the other base stations for the MBS to the serving base station, the designated base station including at least one of the following: a base station with a signal intensity greater than or equal to a set value of the other base stations, or a base station supporting the MBS of the other base stations.

Figure 11:
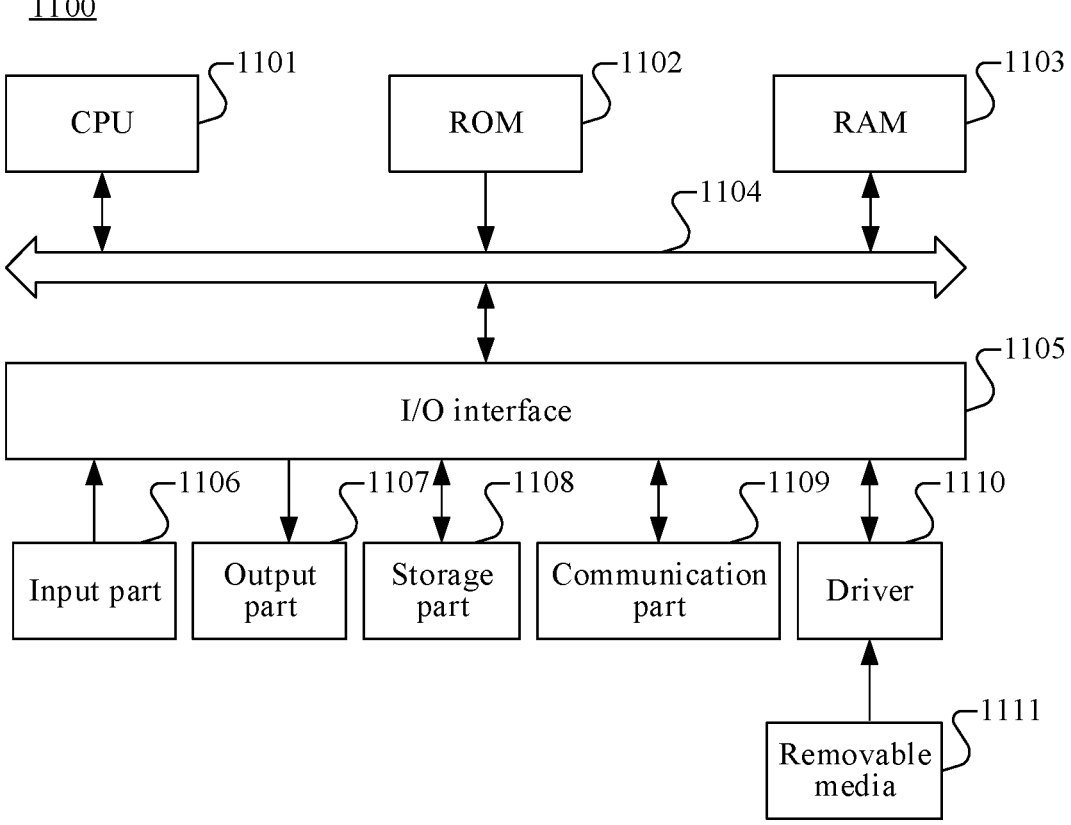
FIG. 11 is a schematic structural diagram of a computer system adapted to implement an electronic device according to an embodiment of this disclosure.

FIG. 11 is a schematic structural diagram of a computer system of an electronic device adapted to implement the embodiments of this disclosure.

It is to be noted that, the computer system 1100 of the electronic device shown in FIG. 11 is merely an example, and does not constitute any limitation on functions and use ranges of the embodiments of this disclosure.

As shown in FIG. 11, the computer system 1100 includes a central processing unit (CPU) 1101 (including processing circuitry), which can execute various appropriate actions and processing according to a program stored in a read-only memory (ROM) 1102 or a program loaded from a storage part 1108 to a random access memory (RAM) 1103 (including a non-transitory computer-readable storage medium storing computer-readable instructions), such as performing the methods described in the foregoing embodiments. The RAM 1103 further stores various programs and data required for operating the system. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard and a mouse, etc.; an output part 1107 including a cathode ray tube (CRT), a liquid crystal display (LCD), a speaker, or the like; a storage part 1108 including hard disk, or the like; and a communication part 1109 including a network interface card such as a local area network (LAN) card, a modem, or the like. The communication part 1109 performs communication processing by using a network such as the Internet. A drive 1110 is also connected to the I/O interface 1105 as required. A removable medium 1111, such as a disk, an optical disc, a magneto-optical disc, or a semiconductor memory, is installed on the drive 1110 as required, so that a computer program read from the removable medium 1111 is installed in the storage part 1108 as required.

Particularly, according to an embodiment of the present disclosure, the processes described above by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed through the communication part 1109 from a network, and/or installed from the removable medium 1111. When the computer program is executed by the CPU 1101, the various functions defined in the system of this disclosure are executed.

It is to be noted that, The computer-readable medium shown in the embodiments of this disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: An electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, an apparatus, or a device. In this disclosure, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable storage medium may be transmitted using any suitable medium, including but not limited to: a wireless medium, a wire medium, or the like, or any suitable combination thereof.

The flowcharts and block diagrams in the accompanying drawings illustrate possible system architectures, functions, and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this disclosure may be implemented in a software manner, or may be implemented in a hardware manner, and the unit described may also be set in a processor. Names of the units do not constitute a limitation on the units in a specific case.

In another aspect, this disclosure further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this disclosure, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this disclosure may be implemented in a form of a software product. The software product may be stored in a nonvolatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this disclosure.

In an embodiment, a non-transitory computer-readable storage medium stores computer-readable instructions which, when executed by a computer device, cause the computer device to perform a multicast and broadcast service (MBS) switching method. The method includes acquiring, by a base station serving a user equipment, capability information of other base stations for an MBS, the capability information indicating whether the MBS is supported by each of the other base stations. The method further includes determining, according to the capability information of the other base stations for the MBS, whether a first base station of the other base stations supports the MBS in response to a determination to switch the MBS of the user equipment to the first base station. The method further includes initiating an MBS switching request to the first base station in response to a determination that the first base station supports the MBS, the MBS switching request indicating to switch the MBS of the user equipment from the base station serving the user equipment to the first base station.

In an embodiment, a non-transitory computer-readable storage medium stores computer-readable instructions which, when executed by a computer device, cause the computer device to perform an MBS switching method. The method includes processing, by processing circuitry of user equipment, an MBS provided by a serving base station, and reporting acquired capability information of other base stations for the MBS to the serving base station, the capability information indicating whether the MBS is supported by each of the other base stations. The method further includes processing, by the processing circuitry of the user equipment, the MBS provided by a first base station of the other base stations when the serving base station switches, based on an MBS switching request, the MBS to the first base station, the MBS switching request being transmitted to the first base station by the serving base station after determining, according to capability information, that the first base station supports the MBS.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A multicast and broadcast service (MBS) switching method, comprising acquiring, by a serving base station serving a user equipment (UE), capability information of neighboring base stations of the serving base station for an MBS, the capability information determined by the UE, the capability information indicating whether the MBS is supported by each of the neighboring base stations and whether each of the neighboring base stations supports a shared tunnel transmission mode in an N3 interface or a dedicated tunnel transmission mode in the N3 interface, the N3 interface being configured to connect the respective one of the neighboring base stations to a user plane function (UPF) entity;

updating, by the serving base station, an automatic neighbor relation (ANR) data according to the capability information;

determining, according to the ANR data and by the serving base station, whether a first base station of the neighboring base stations supports the MBS in response to a determination to switch the MBS of the UE to the first base station; and initiating, by the serving base station, an MBS switching request to the first base station in response to a determination that the first base station supports the MBS, the MBS switching request indicating to switch the MBS of the UE from the serving base station to the first base station.

2. The MBS switching method according to claim 1, wherein the acquiring comprises at least one of:

receiving the capability information of the neighboring base stations for the MBS from the UE;

acquiring the capability information of the neighboring base stations for the MBS through a communication link established with the neighboring base stations; or acquiring the capability information of the neighboring base stations for the MBS from an operation administration and maintenance entity.

3. The MBS switching method according to claim 1, wherein the capability information further indicates:

whether each of the neighboring base stations supports point-to-point broadcast or point-to-multipoint broadcast in an air interface.

4. The MBS switching method according to claim 3, wherein the MBS switching request further indicates a tunnel transmission mode used by the first base station in the N3 interface and a broadcast mode used by the first base station in the air interface, the tunnel transmission mode being the shared tunnel transmission mode or the dedicated tunnel transmission mode.

5. The MBS switching method according to claim 1, wherein the acquiring the capability information comprises:

transmitting a notification message to the UE, the notification message notifying the UE to report the capability information of the first base station for the MBS; and receiving the capability information of the first base station for the MBS from the UE.

6. The MBS switching method according to claim 1, wherein the MBS switching method further comprises:

before determining to switch the MBS of the UE to the first base station, receiving a cell measurement report reported by the UE or receiving a signaling message transmitted by a core network device; and the initiating the MBS switching request comprises:

determining to switch the MBS of the UE to the first base station according to the cell measurement report when the cell measurement report is received; and determining to switch the MBS of the UE to the first base station according to the signaling message when the signaling message is received.

7. The MBS switching method according to claim 1, further comprising:

receiving indication information, transmitted by a core network device, indicating whether to perform data forwarding treatment for the MBS before or during switching the MBS; and transmitting the indication information to the first base station.

8. The MBS switching method according to claim 1, further comprising:

adjusting a configuration message for the MBS based on a policy adjustment instruction received from a core network device, the policy adjustment instruction comprising at least one of: an instruction to adjust a tunnel transmission mode used in the N3 interface, or an instruction to adjust a broadcast mode used in an air interface, the tunnel transmission mode being the shared tunnel transmission mode or the dedicated tunnel transmission mode.

9. A multicast and broadcast service (MBS) switching apparatus for performing an MBS switching method in a serving base station, comprising:

processing circuitry configured to:

acquire capability information of neighboring base stations of the serving base station for an MBS, the capability information determined by a user equipment (UE), the capability information indicating whether the MBS is supported by each of the neighboring base stations and whether each of the neighboring base stations supports a shared tunnel transmission mode in an N3 interface or a dedicated tunnel transmission mode in the N3 interface, the N3 interface being configured to connect the respective one of the neighboring base stations to a user plane function (UPF) entity;

update an automatic neighbor relation (ANR) data according to the capability information;

determine, according to the ANR data, whether a first base station of the neighboring base stations supports the MBS in response to a determination to switch the MBS of the UE to the first base station; and initiate an MBS switching request to the first base station in response to a determination that the first base station supports the MBS, the MBS switching request indicating to switch the MBS of the UE from the serving base station to the first base station.

10. The MBS switching apparatus according to claim 9, wherein the processing circuitry is further configured to perform at least one of:

receive the capability information of the neighboring base stations for the MBS from the UE;

acquire the capability information of the neighboring base stations for the MBS through a communication link established with the neighboring base stations; or acquire the capability information of the neighboring base stations for the MBS from an operation administration and maintenance entity.

11. The MBS switching apparatus according to claim 9, wherein the capability information further indicates:

whether each of the neighboring base stations support point-to-point broadcast or point-to-multipoint broadcast in an air interface.

12. The MBS switching apparatus according to claim 11, wherein the MBS switching request further indicates a tunnel transmission mode used by the first base station in the N3 interface and a broadcast mode used by the first base station in the air interface, the tunnel transmission mode being the shared tunnel transmission mode or the dedicated tunnel transmission mode.

13. The MBS switching apparatus according to claim 9, wherein the processing circuitry is further configured to:

transmit a notification message to the user equipment, the notification message notifying the user equipment to report the capability information of the first base station for the MBS; and receive the capability information of the first base station for the MBS from the UE.

14. The MBS switching apparatus according to claim 9, wherein the processing circuitry is further configured to:

before determining to switch the MBS of the UE to the first base station, receive a cell measurement report reported by the UE or receive a signaling message transmitted by a core network device;

determine to switch the MBS of the UE to the first base station according to the cell measurement report when the cell measurement report is received; and determine to switch the MBS of the UE to the first base station according to the signaling message when the signaling message is received.

15. The MBS switching apparatus according to claim 9, wherein the processing circuitry is further configured to:

receive indication information, transmitted by a core network device, indicating whether to perform data forwarding treatment for the MBS before or during switching the MBS; and transmit the indication information to the first base station.

16. A non-transitory computer-readable storage medium storing instructions which when executed by at least one processor cause the at least one processor of a serving base station serving a user equipment (UE) to perform a multicast and broadcast service (MBS) switching method comprising:

acquiring, by the serving base station, capability information of neighboring base stations of the serving base station for an MBS, the capability information determined by the UE, the capability information indicating whether the MBS is supported by each of the neighboring base stations and whether each of the neighboring base stations supports a shared tunnel transmission mode in an N3 interface or a dedicated tunnel transmission mode in the N3 interface, the N3 interface being configured to connect the respective one of the neighboring base stations to a user plane function (UPF) entity;

updating, by the serving base station, an automatic neighbor relation (ANR) data according to the capability information;

determining, according to the ANR data and by the serving base station, whether a first base station of the neighboring base stations supports the MBS in response to a determination to switch the MBS of the UE to the first base station; and initiating, by the serving base station, an MBS switching request to the first base station in response to a determination that the first base station supports the MBS, the MBS switching request indicating to switch the MBS of the UE from the serving base station to the first base station.

17. The non-transitory computer-readable storage medium according to claim 16, wherein the instructions cause the at least one processor to perform at least one of:

receiving the capability information of the neighboring base stations for the MBS from the UE;

acquiring the capability information of the neighboring base stations for the MBS through a communication link established with the neighboring base stations; or acquiring the capability information of the neighboring base stations for the MBS from an operation administration and maintenance entity.

18. The non-transitory computer-readable storage medium according to claim 16, wherein the capability information further indicates:

whether each of the neighboring base stations support point-to-point broadcast or point-to-multipoint broadcast in an air interface.

19. The non-transitory computer-readable storage medium according to claim 18, wherein the MBS switching request further indicates a tunnel transmission mode used by the first base station in the N3 interface and a broadcast mode used by the first base station in the air interface, the tunnel transmission mode being the shared tunnel transmission mode or the dedicated tunnel transmission mode.

20. The non-transitory computer-readable storage medium according to claim 16, wherein the instructions cause the at least one processor to perform:

transmitting a notification message to the UE, the notification message notifying the UE to report the capability information of the first base station for the MBS; and receiving the capability information of the first base station for the MBS from the UE.

* * * * *